US009461530B2

(12) United States Patent
Wasenczuk et al.

(10) Patent No.: US 9,461,530 B2
(45) Date of Patent: Oct. 4, 2016

(54) ELECTROMECHANICAL GENERATOR FOR CONVERTING MECHANICAL VIBRATIONAL ENERGY INTO ELECTRICAL ENERGY

(75) Inventors: Adam Wasenczuk, Hampshire (GB); Stephen Roberts, Winchester (GB)

(73) Assignee: Perpetuum Ltd., Southampton Hampshire (GB)

( * ) Notice: Subject to any disclaimer, the term of this patent is extended or adjusted under 35 U.S.C. 154(b) by 1015 days.

(21) Appl. No.: 13/392,443

(22) PCT Filed: Aug. 23, 2010

(86) PCT No.: PCT/EP2010/062274
§ 371 (c)(1),
(2), (4) Date: May 7, 2012

(87) PCT Pub. No.: WO2011/023665
PCT Pub. Date: Mar. 3, 2011

(65) Prior Publication Data
US 2012/0212097 A1    Aug. 23, 2012

(30) Foreign Application Priority Data

Aug. 26, 2009   (GB) .................................. 0914918.8

(51) Int. Cl.
*H02K 11/00*    (2016.01)
*H02K 33/00*    (2006.01)
(Continued)

(52) U.S. Cl.
CPC ............... *H02K 35/02* (2013.01); *B06B 1/04* (2013.01)

(58) Field of Classification Search
CPC ........................ H02K 7/065; H02K 35/00

USPC ......... 310/15, 17, 22–25, 28–29, 32, 36, 38, 310/68 C
See application file for complete search history.

(56) References Cited

U.S. PATENT DOCUMENTS 2,472,127 A *   6/1949   Slason ........................... 310/25
3,453,573 A     7/1969   Kyle
(Continued)

FOREIGN PATENT DOCUMENTS

GB    2439411    12/2007
GB    2459269    10/2009
(Continued)

OTHER PUBLICATIONS

Machine Translation JP2001336974 (2001).*
(Continued)

*Primary Examiner* — Jose Gonzalez Quinones
(74) *Attorney, Agent, or Firm* — Colin P. Cahoon; Shaukat A. Karjeker; Carstens & Cahoon, LLP

(57) ABSTRACT

An electromechanical generator for converting mechanical vibrational energy into electrical energy, the electromechanical generator comprising a housing, an electrically conductive coil assembly fixedly mounted in the housing, a magnetic core assembly movably mounted in the housing for linear vibrational motion along an axis, a first biasing device, mounted between the housing and the magnetic core assembly, adapted to apply a centering force acting to oppose movement of the magnetic core assembly away from a central position on the linear axis and a second magnetic biasing device adapted to provide a compensating force to compensate for variations in the centering force of the first biasing device due to temperature.

22 Claims, 2 Drawing Sheets

(51) Int. Cl.
*H02K 35/00* (2006.01)
*H02K 35/02* (2006.01)
*B06B 1/04* (2006.01)

(56) References Cited

U.S. PATENT DOCUMENTS

| | | | |
|---|---|---|---|
| 3,582,874 A | 6/1971 | Fedoseenko | |
| 6,385,327 B1* | 5/2002 | D'Hoogh | 381/398 |
| 2008/0265692 A1* | 10/2008 | Roberts | 310/15 |

FOREIGN PATENT DOCUMENTS

| | | | |
|---|---|---|---|
| JP | 2001336974 A | | 7/2001 |
| JP | 2001336974 A | * | 12/2001 |
| WO | 2008132423 A1 | | 11/2008 |

OTHER PUBLICATIONS

Japanese Office Action mailed Jun. 20, 2014, for Japanese Patent Application 2012-526025 filed Jun. 26, 2012 (8 pages, including translation).

PCT International Search Report and Written Opinion for PCT/EP2010/062274 mailed on Jan. 25, 2012.

GB Search Report for GB Application No. 0914918.8 mailed on Dec. 18, 2009.

Vinod R Challa, et al.; A vibration energy harvesting device with bidirectional resonance frequency tunability; Smart Materials and Structures; pp. 1-10; printed in the UK.

Europe Search Report dated Aug. 26, 2015, for Application No. EP 10 747 450.4 (7 pages).

* cited by examiner

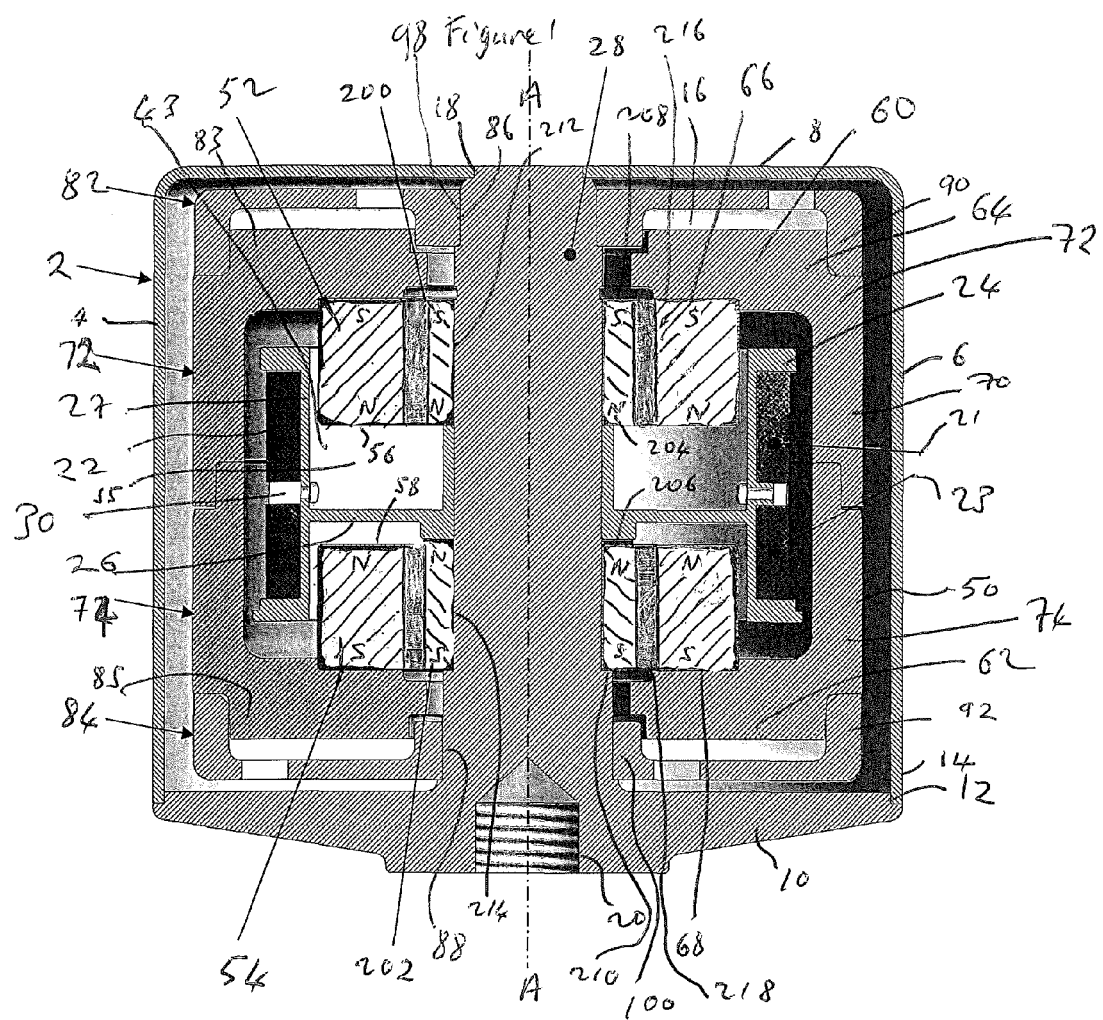

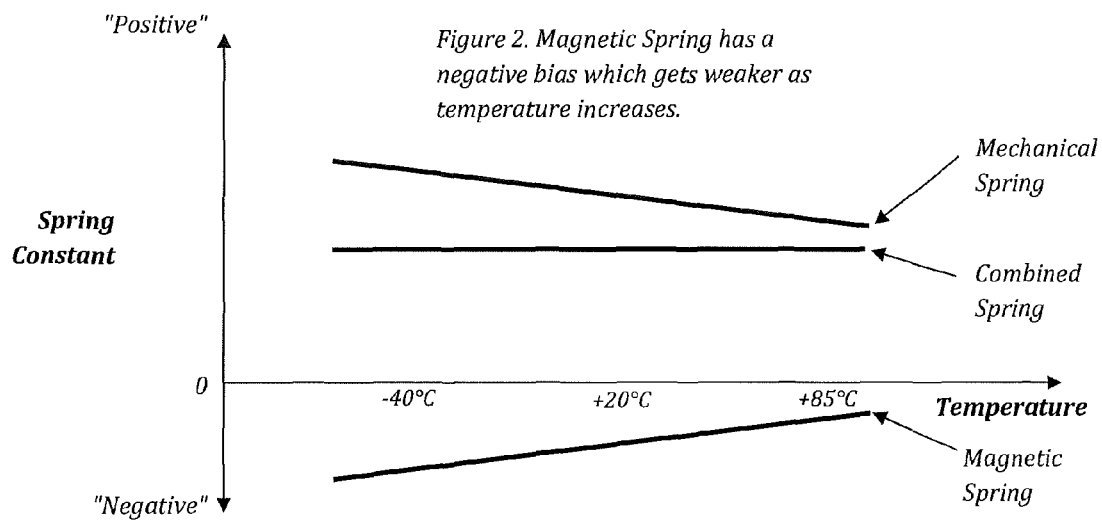
Figure 2. Magnetic Spring has a negative bias which gets weaker as temperature increases.
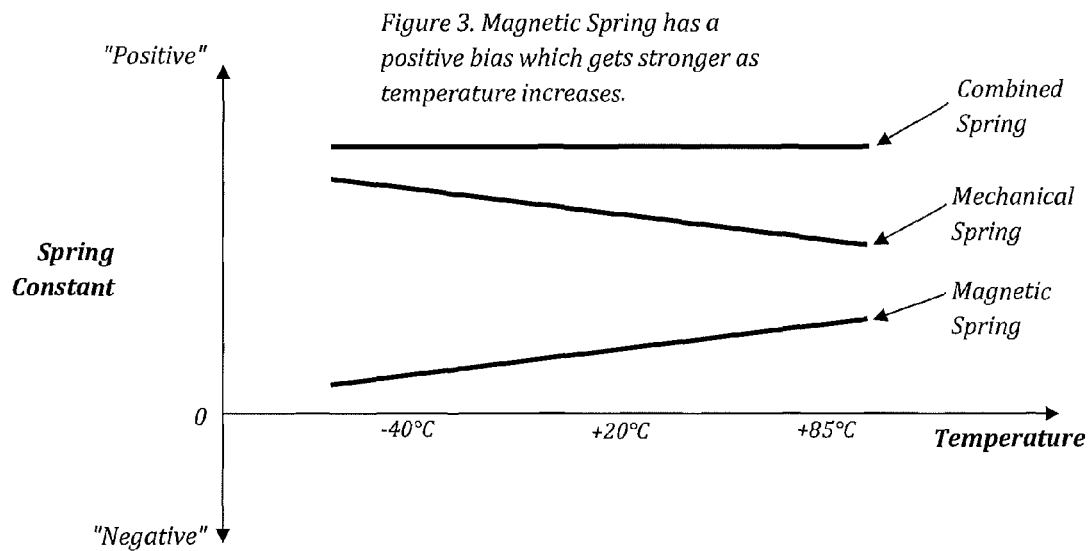
Figure 3. Magnetic Spring has a positive bias which gets stronger as temperature increases.

ELECTROMECHANICAL GENERATOR FOR CONVERTING MECHANICAL VIBRATIONAL ENERGY INTO ELECTRICAL ENERGY

BACKGROUND TO THE INVENTION

The present invention relates to an electromechanical generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

DESCRIPTION OF THE PRIOR ART

It is known to use an electromechanical generator for harvesting useful electrical power from ambient vibrations, e.g. for powering wireless sensors. A typical magnet-coil generator consists of a mechanical spring-mass combination attached to a magnet or coil in such a manner that when the system vibrates, a coil cuts through the flux formed by a magnetic core.

Vibration energy harvesters need to have either a fixed natural (resonant) frequency or a bandwidth which is made large enough to cope with any changes in this frequency as operating temperature changes. As power-bandwidth product is a fixed quantity at a particular vibration level, making the bandwidth wider generally reduces the power output. Hence it is desirable to avoid having to make the bandwidth wider by making the frequency less sensitive to temperature.

Vibration energy harvesters consist of mechanical resonators with either electromagnetic induction or piezo-electric power transduction. In either case the mechanical resonator consists of a sprung mass. It is the thermal change in elastic modulus (thermo-elastic effect) of the springs that causes the natural frequency to vary as the operating temperature does. For instance, carbon spring steel (the most economic variety of spring material) has a thermo-elastic constant of $-2.6\times10^{-4}K^{-1}$. This results in a natural frequency variation of approximately 1.6% over the industrial temperature range, $-40°$ C. to $+85°$ C., irrespective of resonator form or mass.

It is possible to use spring alloys that exhibit lower thermo-elastic coefficients, such as the nickel-iron alloy "NISPAN-C", but these are not commonly available and are economically expensive.

SUMMARY OF THE INVENTION

The present invention aims to provide a device that can solve this problem by providing a device with little or no change in natural frequency within the industrial temperature range, being from $-40°$ C. to $+85°$ C., The present invention accordingly provides an electromechanical generator for converting mechanical vibrational energy into electrical energy, the electromechanical generator comprising a housing, an electrically conductive coil assembly fixedly mounted in the housing, a magnetic core assembly movably mounted in the housing for linear vibrational motion along an axis, a first biasing device, mounted between the housing and the magnetic core assembly, adapted to apply a centering force acting to oppose movement of the magnetic core assembly away from a central position on the linear axis and a second magnetic biasing device adapted to provide a force along the axis to compensate for variations in the centering force of the first biasing device due to temperature.

Preferably, the first and second biasing devices have substantially the same rate of change of spring constant with temperature to provide an overall spring constant for the first and second biasing devices that is substantially constant over a working temperature range of from $-40°$ C. to $+85°$ C.

Typically, the substantially constant spring constant for the first and second biasing devices provides that the natural frequency of the vibrational motion varies by no more than 1%, more preferably less than 0.5%, yet more preferably less than 0.2%, most typically about 0.16%, over a working temperature range of from $-40°$ C. to $+85°$ C. For an electromechanical generator having a natural frequency of the vibrational motion of 120 Hz, the natural frequency varies by as little as $+/-0.1$ Hz over a working temperature range of from $-40°$ C. to $+85°$ C.

The first biasing device and second biasing devices are adapted to apply a combined centering force towards the central position when the magnetic core assembly is displaced therefrom.

In one embodiment, the first biasing device is adapted to provide a centering force towards the central position when the magnetic core assembly is displaced therefrom and the second biasing device is adapted to provide a temperature compensating centering force additional to the centering force of the first biasing device. The centering force of the first biasing device may decrease with increasing temperature whereas the centering force of the second biasing device may increase with increasing temperature, thereby providing a combined centering force which is substantially constant over the temperature range.

In another embodiment, the first biasing device is adapted to provide a centering force towards the central position when the magnetic core assembly is displaced therefrom and the second biasing device is adapted to provide a non-centering force against the centering force and smaller than the centering force when the magnetic core assembly is displaced from the central position. The centering force of the first biasing device may decrease with increasing temperature and the non-centering force of the second biasing device may also decrease with increasing temperature, thereby providing a combined centering force which is substantially constant over the temperature range.

In either of these embodiments, the aim is to provide a temperature compensating spring force, centering or non-centering, which reduces, preferably minimizes, and most preferably eliminates, any temperature variation over the working range of the spring constant, and, consequently, the centering force which urges the movable element back to the central position when it is vibrated away therefrom. This correspondingly minimises any temperature variation in the natural frequency of the device, as discussed above, and typically achieves an improvement in the stability of the natural frequency over the working temperature range of from $-40°$ C. to $+85°$ C. of about 1000% as compared to using steel mechanical springs, as used in the state of the art, without the need for expensive spring alloys, such as "NISPAN-C".

Preferably, for the latter embodiment, the second biasing device comprises a magnetic biasing device which is adapted to apply a magnetic force to the magnetic core assembly in a direction away from the central position when the magnetic core assembly is displaced from the central position.

More preferably, the second biasing device comprises at least one compensation magnet disposed adjacent to but spaced from a respective main magnet of the magnetic core assembly.

Preferably, the compensation magnet is annular and located radially inwardly of a respective annular main magnet.

Preferably, the compensation magnet and the respective main magnet are oriented with magnetic polarity in a common direction.

The present invention further provides an electromechanical generator for converting mechanical vibrational energy into electrical energy, the electromechanical generator comprising a housing, an electrically conductive coil assembly fixedly mounted in the housing, a magnetic core assembly movably mounted in the housing for linear vibrational motion along an axis at a natural frequency, a first mechanical biasing device, mounted between the housing and the magnetic core assembly, adapted to apply a centering force acting to oppose movement of the magnetic core assembly away from a central position along the axis and a second magnetic biasing device adapted to provide a centering or non-centering force to compensate for variations in the centering force of the first biasing device due to temperature to provide that the natural frequency of the vibrational motion varies by no more than 1% over a working temperature range of from −40° C. to +85° C.

The present invention is predicated at least partly, as embodied in the first embodiment, on the finding by the present inventor that by using magnets as "springs" to provide a centering or non-centering force alongside mechanical springs, for example conventional spring steel springs, which provide a centering force, it is possible to produce an energy harvesting device, incorporating a mechanical resonator consisting of a sprung mass, which can exhibit little or no change in natural frequency within the industrial temperature range by using a combination of the two types of spring. The two types of spring are selected to provide a correct relationship between net centering force, composed of the sum of the opposing centering and non-centering forces, or the sum of the common centering forces, and thermal properties.

However, in accordance with other aspects of the present invention, other types of temperature compensating magnetic biasing devices adapted to provide a compensating force to compensate for variations in the centering force of the first biasing device due to temperature over the working range will be readily apparent to those skilled in the art.

Other preferred features are defined in the dependent claims.

In the electromechanical generator of the preferred embodiment of the present invention a high moving mass can be achieved by filling almost all of the internal space with a metallic magnetic core assembly. This can be achieved at least partly because flat springs at opposed ends of the magnetic core assembly are volume efficient. In addition, a high Q comes from the fact that the "enclosed" structure of the magnetic core assembly leaks very little flux, and so there is very little eddy current in the surrounding material of the stationary housing. Accordingly, little clearance needs to be kept between the moving magnetic core assembly and the housing, allowing more moving mass. A high magnetic coupling comes also from the enclosed nature of the magnetic core assembly where very little flux leaks out—almost all the magnetic flux gets channeled through the coil. The second biasing device to provide temperature compensation of the first, main, biasing device does not take up excessive volume and is within the magnetic core and so does not reduce the moving mass, or increase the volume of the electromechanical generator.

The second magnetic biasing device can readily be designed by the skilled person so as not significantly to reduce the Q factor even though it may induce some eddy currents in the core.

BRIEF DESCRIPTION OF THE DRAWINGS

Embodiments of the present invention will now be described by way of example only with reference to the accompanying drawings, in which:

FIG. 1 is a schematic side section through an electromechanical generator for converting mechanical vibrational energy into electrical energy in accordance with a first embodiment of the present invention;

FIG. 2 is a graph showing the relationship between spring constant and temperature for a mechanical spring and a magnetic spring, and the combination thereof which is used in a first arrangement of the electromechanical generator of FIG. 1; and FIG. 3 is a graph showing the relationship between spring constant and temperature for a mechanical spring and a magnetic spring, and the combination thereof which is used in a second arrangement of the electromechanical generator of FIG. 1.

DETAILED DESCRIPTION OF THE PREFERRED EMBODIMENTS

The electromechanical generator of the present invention is a resonant generator known in the art as "velocity-damped" where all of the work done by the movement of the inertial mass relative to the housing is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

FIG. 1 shows an electromechanical generator 2 for converting mechanical vibrational energy into electrical energy in accordance with a first embodiment of the present invention. The electromechanical generator 2 comprises a housing 4. The housing 4 comprises an annular outer peripheral wall 6, an integral circular lid 8 and a circular base 10. The base 10 is securely fitted at its circular edge 12 to a lower edge 14 of the outer peripheral wall 6, for example by means of adhesive or a threaded coupling (not shown). The outer peripheral wall 6 defines a cylindrical cross-section interior volume 16, having an axis of rotation A-A. A circular opening 18 is formed through the lid 8, which opening 18 is coaxial with the cylindrical cross-section interior volume 16. The base 10 is provided with a fitting 20 in its outer surface for securely mounting the electromechanical generator 2 to a support (not shown).

An electrically conductive coil 22 is fixedly mounted in the housing 4. The coil 22 is circular and is coaxial with the housing 4, and has upper and lower windings 21, 23, oriented parallel to the axis of rotation A-A. The coil 22 is mounted within an annular coil support 24 which is located substantially midway in a radial direction between the axis A-A and the outer peripheral wall 6, and also substantially midway in an axial direction between the lid 8 and the base 10. The coil support 24 has an integral annular central mounting portion 26 that extends radially inwardly from a substantially central part of the coil 22 and is mounted on a central tubular body, or mast, 28 that is securely fitted between the lid 8 and the base 10. The mounting portion 26 includes a support 27 which defines an annular recess 30 for the coil 22. This assembly mounts the coil 22 in a fixed position within the housing 4. Preferably the coil support 24 is made from a very low-conductivity material, such as glass-loaded plastics material. Preferably the central tubular body 28 is made from a low-permeability, low-conductivity, but high-elastic-modulus material, such as 316 stainless steel.

A magnetic core assembly 50 is movably mounted in the housing 4 for linear vibrational motion along the axis A-A. The magnetic core assembly 50 is rotationally symmetric and includes a pair of axially aligned annular main magnets 52, 54, each typically a rare earth permanent magnet having a high magnetic field strength The main magnets 52, 54 are mounted on opposite sides, above and below, of the mounting portion 26 and radially inwardly of the coil 22. The main magnets 52, 54 are each axially spaced from the mounting portion 26, and define a gap 55 through which the mounting portion 26 extends. As shown in FIG. 1, the main magnets 52, 54 are aligned so that their identical poles 56, 58 (e.g. the north (N) poles as shown in FIG. 1) face each other on opposite sides of the mounting portion 26.

The magnetic core assembly 50 also includes a common ferromagnetic body 64. The main magnets 52, 54 are mounted between opposed annular arms 60, 62 of the common ferromagnetic body 64. The poles 66, 68 (e.g. the south (S) poles) of the main magnets 52, 54 that face away from each other in an axially outward direction are each mounted on a respective annular arm 60, 62. The common ferromagnetic body 64 also includes a tubular portion 70 comprised of two mutually interlocking tubular members 72, 74, each integral with a respective annular arm 60, 62. In this way, each of the upper and lower coil windings 21, 23 is respectively at least partly located between tubular portion 70 of the common ferromagnetic body 64 and one of the main magnets 52, 54.

This magnetic core assembly 50 of the radially outer common ferromagnetic body 64 coupled to the radially inner main magnets 52, 54 defines therebetween an annular enclosed cavity 43 in which the coil 22 is received. The main magnets 52, 54 are in the vicinity of the inner side of the coil 22 and the common ferromagnetic body 64 is in the vicinity the outer side of the coil 22. The main magnets 52, 54 and the common ferromagnetic body 64 are slightly spaced from the coil 22 to permit relative translational movement therebetween. The magnetic core assembly 50 therefore has a substantially C-shaped cross-section and is rotationally symmetric.

The common ferromagnetic body 64 is composed of a ferromagnetic material having a high magnetic permeability, and a high mass, such as soft iron. The assembly of the common ferromagnetic body 64 and the main magnets 52, 54 therefore forms two axially spaced magnetic circuits of the magnetic core assembly 50, one for each main magnet 52, 54. The limits of the lines of magnetic flux each magnetic circuit are defined by the respective annular arm 60, 62 and tubular member 72, 74, which substantially prevents magnetic flux from each magnet 52, 54 extending axially or radially outwardly from the common ferromagnetic body 64. Since the opposed main magnets 52, 54 face each other with common poles 56, 58 (e.g. N poles), at the central region of the magnetic core assembly 50 the magnetic flux of the opposed magnetic circuits are in opposition thereby directing the magnetic flux radially outwardly towards the common ferromagnetic body 64.

The resultant effect is that a single magnetic core assembly 50 comprises two separate main magnets 52, 54 and each has a respective magnetic circuit in which a very high proportion of the magnetic flux is constrained to pass through the respective coil winding 21, 23. This in turn provides a very high degree of magnetic coupling between the main magnets 52, 54 and the coil 22. Consequently, any relative movement between the main magnets 52, 54 and the coil 22, in particular as described below by linear axial resonant movement of the magnetic core assembly 50 relative to the fixed coil 22, produces a very high electrical power output at the coil 22.

The common ferromagnetic body 64 is movably mounted to the central tubular body 28 by a pair of opposed plate springs 82, 84. One spring 82, 84 is located between each respective upper or lower end 83, 85 of the common ferromagnetic body 64 and a respective upper or lower end 86, 88 of the central tubular body 28. A radially inner annular edge 98, 100 of each spring 82, 84 is securely fitted, e.g. by a screw thread, to the respective upper or lower end 86, 88. A radially outer annular edge 90, 92 of each spring 82, 84 is securely fitted, e.g. by a screw thread, to the respective upper or lower end 83, 85 of the common ferromagnetic body 64.

The two springs 82, 84 each apply the same mechanical biasing force against the magnet assembly 50 when the magnetic core assembly 50 is moved away from a central equilibrium position, to provide a centering force. The two springs 82, 84 preferably have the same spring constant. The two springs 82, 84 are typically composed of steel.

The provision of a pair of plate springs 82, 84 at opposed axial ends of the movable magnetic core assembly 50 provides a structure that can not only provide a sufficient spring biased centering force on the magnetic core assembly 50 to bias it towards an axially central position with respect to the coil 22 but also takes up substantially minimum volume within the housing 4. In particular, the location of the springs 82, 84 at opposed axial ends of the movable magnetic core assembly 50 enables the magnetic core assembly 50 to extend radially outwardly substantially as far as the interior radial limits of the housing 4. This maximizes the size of the magnetic core assembly 50 for a given interior volume 16, which not only maximizes the magnetic coupling, but also importantly permits the mass of the movable magnetic core assembly to be correspondingly maximized. As known in the art, there is a desire to maximize the mass of the movable magnetic core assembly in a resonant vibrational electromagnetic energy harvester because this increases the output electrical power.

The provision of a pair of plate springs 82, 84 also avoids the need for expensive and cumbersome helical springs surrounding the movable magnetic core assembly. This decreases the manufacturing cost by reducing the component cost.

In accordance with one embodiment of the present invention, in addition to the plate springs 82, 84 the electromechanical generator 2 includes a magnetic biasing device which provides a non-centering force acting in opposition to the mechanical centering force provided by the springs 82, 84.

This embodiment of the invention involves using a mechanical spring system, using the plate springs 82, 84, which is a centering spring to bias the magnetic core assembly 50 towards a central position, and a magnetic spring (a non-centering spring which biases the magnetic core assembly 50 away from the central position by a non-centering force) to support the resonator mass. As shown in FIG. 2, both of these spring systems reduce in spring constant magnitude as the temperature rises, the mechanical spring reducing in positive spring constant and the magnetic spring reducing in negative spring constant. The (negative) magnetic spring constant is, in this embodiment, about five-times weaker greater than the (positive) mechanical spring constant. However, for the same temperature rise over the industrial temperature range, the rate of change of the spring constant represented by the slope of the lines in FIG. 2 is substantially the same for both the magnetic spring and for the mechanical spring.

Hence by combining a relatively strong positive mechanical spring system as a centering spring in combination with a relatively weak negative magnetic spring as a non-centering spring, it is possible to produce an overall positive centering spring with zero (or low) variation with temperature. This is represented by the "combined spring" line in FIG. 2, which has a very small or almost zero slope.

In the illustrated embodiment, the temperature variation of a strong positive mechanical spring is temperature compensated by a weak negative magnetic spring.

However, other temperature-compensating magnetic spring systems will be readily apparent to the person skilled in the art, for example those which are positive rather than negative.

For example, as shown in FIG. 3, the magnetic spring, instead of having a bias which is opposite to that of the mechanical spring as for the previous embodiment (i.e. provides a non-centering force), has a bias which is in the same direction as the bias of the mechanical spring (i.e. provides a centering force). The temperature compensation is provided by selecting a magnetic material so that the magnetic spring constant increases with increasing temperature to compensate for the mechanical spring constant which decreases with increasing temperature. The result is a substantially constant combined spring constant which is the sum of the two positive mechanical and magnetic spring constants.

In the illustrated embodiment of FIG. 1, the magnetic spring comprises two annular "compensation" magnets 200, 202 which are fixed by respective radially inner surfaces 212, 214 to the central tubular body 28. The compensation magnets 200, 202 are symmetrically positioned radially inside the respective main magnets 52, 54 which move with the magnetic core assembly 50, but are spaced therefrom by a respective annular gap 216, 218. The compensation magnets 200, 202 are correspondingly separated from the magnetic core assembly 50. The compensation magnets 200, 202 preferably have the same height in the axial direction A-A as the main magnets 52, 54, and in the rest position the compensation magnets 200, 202 and the respective main magnets 52, 54 are preferably disposed at the same location along the axial direction A-A. The compensation magnets 200, 202 have identical facing poles 204, 206 (e.g. N poles) and opposed poles 208, 210 (e.g. S poles) and the polar orientation is the same as that for the main magnets 52, 54. Accordingly, for both the main magnets 52, 54 and the compensation magnets 200, 202 the adjacent poles radially across the respective annular gap 216, 218 are identical.

When the position of the moving core assembly 50 and the main magnets 52, 54 is exactly central as shown in FIG. 1, under a rest condition when the electromechanical generator 2 is not excited by vibrational mechanical energy, the compensation magnets 200, 202 exert no force on the moving core assembly 50. However when the moving core assembly 50 is offset axially in the direction A-A in either the up or down directions, the compensation magnets 200, 202 exert a repulsive centering force on the moving core assembly 50 in the direction of the offset. Hence a "negative" non-centering magnetic spring is established which provides a non-centering force working against the "positive" centering mechanical springs which provide a centering force restoring the moving core assembly 50 to the central position. The centering force is larger than the non-centering force as shown in FIG. 2 so the combined force is a net centering force restoring the moving core assembly 50 to the central position, but with a very small or even zero sensitivity to variation due to temperature fluctuations.

The commonly-used magnetic material sintered NdFeB exhibits a reversible reduction (within a limited temperature range) in both Br (remanence) and Hc (coercivity) as temperature increases. The use of such a material in a magnetic spring results in a large temperature-induced reduction in spring constant that is may be employed in accordance with the preferred embodiments of the present invention. Other magnetic materials such as ferrite and AlNiCo may alternatively be used. The magnetic material SmCo exhibits a small increase in remanence as temperature increases, which permits its use in a "positive" magnetic spring within the scope of the present invention.

Other known energy harvesters using electromagnetic induction already contain permanent magnets and so integration of such a negative magnetic spring into the respective design would be straightforward for the skilled person.

The compensation magnets 200, 202 take up a relatively small volume within the periphery of the magnetic core assembly 50 and so do not increase the volume of the electromechanical generator 2 or decrease the mass of the movable magnetic core assembly 50. The location of the compensation magnets 200, 202 at a fixed position radially inwardly of the respective main magnets 52, 54 has only a minor effect on the establishment of the two opposed magnetic circuits of the magnetic core assembly 50.

The high degree of magnetic coupling between the movable magnetic core assembly and the coil, and the high mass of the movable magnetic core assembly, enables the resonant frequency readily to be tuned accurately to a desired value, and also permits a high net self-restoring or centering force to be applied to the movable magnetic core assembly during its resonant oscillation to minimize the amplitude of the oscillation. Since the amplitude is limited, the main springs 82, 84 are only ever deformed by a very small degree, well within their linear spring characteristics. Typically, the maximum amplitude is less than about 1 mm. Again, this maximizes the useful volume 16 of the housing 4 in an axial direction.

The main springs 82, 84 bias, back towards the central position, the magnetic core assembly 50 which can move axially along the axis A-A when the electromechanical generator 2 is subjected to an applied mechanical force, in particular a mechanical vibration, having at least a component along the axis A-A. The main springs 82, 84 have a high stiffness in the lateral, i.e. radial, direction so as substantially to prevent non-axial movement of the magnetic core assembly 50.

The interior volume 16 of the housing 4 may include a gas. The housing 4 may hermetically seal the interior volume 16 of the housing 4.

The electromechanical generator 2 uses a resonant mass-spring arrangement mounted within the housing 4. If the electromechanical generator 2 is subject to a source of external vibration that causes it to move along the direction A-A, then the magnetic core assembly 50 comprises an inertial mass which may move relative to the housing 4, also along the direction A-A. In doing so, the main springs 82, 84 are deformed axially, and work is done against a damper comprising the static electrical coil and the movable magnetic core assembly that generates a region of magnetic flux within which the electrical coil is disposed. Movement of the electrical coil within the magnetic flux causes an electrical current to be induced in the electrical coil which can be used as a source of electrical power for driving an external device (not shown).

Also, although in this embodiment the main springs are plate springs, other biasing elements may be employed.

The mass of the magnetic core assembly can be made to be very high relative to the size of the device, thereby to increase the overall mass density of the device as compared, for example, to a cantilever device. For a given volume to be occupied by the device, a greater moving mass can be provided. This also maximizes the electrical power output, for the reasons stated above.

By increasing the electrical output, as a result of increased magnetic coupling, the operating band width of the device can be greatly increased. This in turn greatly enhances the ability of the device to be used in many new energy harvesting applications.

Simple plate springs can be employed in the electromechanical generator. This provides a reliable and simple structure to prevent lateral movement on the magnetic core assembly, with low friction and avoiding complicated, intricate and/or expensive manufacturing techniques. The resultant structure is robust and compact. Since the plate springs are subjected to a very low amplitude of deformation, their mechanical properties are not especially critical, because they are never deformed anywhere near their mechanical limits of linear elastic movement, and so they can accordingly be of relatively conventional quality, and consequently have a low component cost. Correspondingly, the magnetic spring has a very low component cost. The combined spring system provides a low cost but robust and reliable solution to the problem of achieving a highly stable electrical output that is substantially independent of temperature fluctuations.

Other modifications and embodiments of the present invention will be apparent to those skilled in the art.

The invention claimed is:

1. An electromechanical generator for converting mechanical vibrational energy into electrical energy, the electromechanical generator comprising a housing, an electrically conductive coil assembly fixedly mounted in the housing, a magnetic core assembly movably mounted in the housing for linear vibrational motion along an axis, a first biasing device, mounted between the housing and the magnetic core assembly, adapted to apply a centering force acting to oppose movement of the magnetic core assembly away from a central position on the linear axis and a second magnetic biasing device adapted to provide a compensating force to compensate for variations in the centering force of the first biasing device due to temperature.

2. An electromechanical generator according to claim 1 wherein the first biasing device and the second magnetic biasing device have substantially the same rate of change of spring constant with temperature over a working temperature range to provide an overall spring constant for the first biasing device and second magnetic biasing device that is substantially constant over a working temperature range of from −40° C. to +85° C.

3. An electromechanical generator according to claim 2 wherein the substantially constant spring constant for the first biasing device and the second magnetic biasing device provides that the natural frequency of the vibrational motion varies by no more than 1% over a working temperature range of from −40° C. to +85° C.

4. An electromechanical generator according to claim 1 wherein the first biasing device is adapted to provide a centering force towards the central position when the magnetic core assembly is displaced therefrom and the second magnetic biasing device is adapted to provide a temperature compensating centering force additional to the centering force of the first biasing device.

5. An electromechanical generator according to claim 4 wherein the centering force of the first biasing device decreases with increasing temperature whereas the centering force of the second magnetic biasing device increases with increasing temperature, thereby providing a combined centering force which is substantially constant over the temperature range.

6. An electromechanical generator according to claim 1 wherein the first biasing device is adapted to provide a centering force towards the central position when the magnetic core assembly is displaced therefrom and the second magnetic biasing device is adapted to provide a non-centering force against the centering force and smaller than the centering force when the magnetic core assembly is displaced from the central position.

7. An electromechanical generator according to claim 6 wherein the centering force of the first biasing device decreases with increasing temperature and the non-centering force of the second magnetic biasing device decreases with increasing temperature, thereby providing a combined centering force which is substantially constant over the temperature range.

8. An electromechanical generator according to claim 1 wherein the second magnetic biasing device is adapted to apply a compensating magnetic force to the magnetic core assembly.

9. An electromechanical generator according to claim 1 wherein the second magnetic biasing device is adapted to apply a magnetic force to the magnetic core assembly when the magnetic core assembly is displaced from the central position.

10. An electromechanical generator according to claim 9 wherein the second magnetic biasing device comprises at least one compensation magnet disposed adjacent to but spaced from a respective main magnet of the magnetic core assembly.

11. An electromechanical generator according to claim 10 wherein the compensation magnet is annular and located radially inwardly of a respective annular main magnet.

12. An electromechanical generator according to claim 10 wherein the compensation magnet and the respective main magnet are oriented with magnetic polarity in a common direction.

13. An electromechanical generator according to claim 1 wherein the second magnetic biasing device is fixedly mounted in the housing.

14. An electromechanical generator according to claim 13 wherein the coil assembly and the second magnetic biasing device are fixed to a central element, mounted in the housing, extending along the axis.

15. An electromechanical generator according to claim 14 wherein the first biasing device comprises a pair of main mechanical springs, each being located at a respective end of the magnetic core assembly and being fixed between the central element and the magnetic core assembly.

16. An electromechanical generator according to claim 15 wherein the main springs comprise plate springs.

17. An electromechanical generator according to claim 10 wherein the magnetic core assembly comprises two opposed magnetic circuits spaced along the axis, each magnetic circuit comprising a respective main magnet, and each main magnet being mounted adjacent to but spaced from a respective compensation magnet.

18. An electromechanical generator according to claim 10 wherein the magnetic core assembly comprises a pair of main magnets spaced along the axis, poles of the main magnets having a first common polarity facing towards each other, and poles of the main magnets facing away from each other being of a second common polarity and being coupled to a common ferromagnetic body located radially outwardly of the main magnets relative to the axis.

19. An electromechanical generator according to claim 18 wherein the common ferromagnetic body is tubular and has radially inwardly extending arms at each end thereof, each arm mounting a respective main magnet thereon, and the common ferromagnetic body comprises radially outer and upper and lower portions of the magnetic core assembly and the main magnets comprise the radially inner portion.

20. An electromechanical generator for converting mechanical vibrational energy into electrical energy, the electromechanical generator comprising a housing, an electrically conductive coil assembly fixedly mounted in the housing, a magnetic core assembly movably mounted in the housing for linear vibrational motion along an axis at a natural frequency, a first mechanical biasing device, mounted between the housing and the magnetic core assembly, adapted to apply a centering force acting to oppose movement of the magnetic core assembly away from a central position along the axis and a second magnetic biasing device adapted to provide a centering or non-centering force to compensate for variations in the centering force of the first biasing device due to temperature to provide that the natural frequency of the vibrational motion varies by no more than 1% over a working temperature range of from −40° C. to +85° C.

21. An electromechanical generator according to claim 20 wherein the first biasing device is adapted to provide a centering force towards the central position when the magnetic core assembly is displaced therefrom and the second magnetic biasing device is adapted to provide a non-centering force against the centering force and smaller than the centering force when the magnetic core assembly is displaced from the central position, and wherein the centering force of the first biasing device decreases with increasing temperature and the non-centering force of the second magnetic biasing device decreases with increasing temperature, thereby providing a combined centering force which is substantially constant over the temperature range.

22. An electromechanical generator according to claim 20 wherein the second magnetic biasing device is adapted to apply a compensating magnetic force to the magnetic core assembly.

* * * * *